United States Patent Office 3,079,235
Patented Feb. 26, 1963

3,079,235
METHOD OF PREPARING METALLIC NICKEL AND NICKEL CARBONYL
Ibrahim Dakli, Busto Arsizio, and Luigi Corsi, Milan, Italy, assignors to Montecatini Società Generale per l'Industria Mineraria e Chimica, Milan, Italy, a corporation of Italy
No Drawing. Filed Nov. 27, 1956, Ser. No. 624,522
Claims priority, application Italy Dec. 2, 1955
16 Claims. (Cl. 23—203)

This invention relates to a new method of preparing nickel carbonyl.

Numerous methods for preparing nickel carbonyl are in existence. Some of them, such as the Mond process of purifying raw nickel, are based on reactions between gas and metallic nickel in the dry state, while others are based on reactions between gas and solutions or suspensions of nickel compounds.

The process using nickel oxide as an intermediate requires, in the first place, some preliminary operations in order to convert other nickel compounds into nickel oxide. Subsequently thereto, these processes require high temperatures, about 300–400° C., and long reduction periods in order to produce reduced nickel from the oxide. As a compensation, the process requires only moderate temperatures and pressures for the carbonylation reaction between reduced nickel and carbon monoxide.

The other processes, starting from nickel salts solutions or nickel hydroxide suspensions, are more simple as far as the process steps are concerned, but require much more drastic operating conditions. Thus, the conversion of the $Ni(CH_3)_6Cl_2$-complex into nickel tetracarbonyl by treatment with carbon monoxide requires temperatures of 80–170° C. at a pressure of 50–200 atm. and involves serious problems of selecting equipment that is resistant to the reactants at the required reaction conditions. According to other disclosures concerned with nickel carbonyl hydroxide, a conversion catalyzed with alkali sulfides or cyanides, by means of reacting directly with carbon monoxide occurs under relatively drastic temperature and pressure conditions, such as at temperatures above 60° C. and at a pressure in excess of 50 atm. However, even at a temperature above 80° C. and a pressure higher than 50 atm., the reaction is slow and requires at least twenty hours; while at 40° C. it is so slow that it is not suitable for commercial practice.

In the direct reaction between nickel hydroxide and carbon monoxide, for every mol of nickel tetracarbonyl formed, one mole carbon dioxide is obtained which, in the subsequent stage of recovering nickel carbonyl, would cause some difficulties and, therefore, must be removed either by washing with water or by treatment with alkalies. In both cases the consumption of energy and reaction materials is rather high and intricate equipment is required.

Now we have found and this is the object of the present invention, that, if the reduction of nickel hydroxide and the carbonylation of the finely divided nickel suspension thus obtained are carried out in separate stages, the carbonylation is performed without the presence of practically any $CO_2$, because $CO_2$ cannot form at the first stage due to the reducing action of hydrogen which is being used, or the $CO_2$ is readily discharged after the first stage if the reduction is carried out with carbon monoxide.

According to the present invention a catalyst is used consisting of an organic or inorganic sulfide, such as $Na_2S$, $CS_2$ or barium sulfide, which permits to operate at moderate temperatures and pressures, at least during the second stage of carbonylation.

It is known that an aqueous suspension of nickel hydroxide purified by washing can be reduced with hydrogen at a temperature between 80 and 150° C. and under pressure between 40 and 60 atm., resulting in active nickel suitable as a catalyst for certain hydrogenation processes. The hydroxide reduction under these conditions requires 6 hours to be completed.

We have now found that, if operating in the presence of sulfides, this reduction proceeds catalytically and is completed in about 30 minutes at 140° C. under a hydrogen partial pressure of 30 atm. At higher temperatures and pressures the time required is still less. Moreover, the catalyst concentration influences the redutcion rate to a substantial degree. For example, at a molar ratio of $Ni:Na_2S=10:1$, operating at 140° C. and under a hydrogen partial pressure of 40 atm., the reduction is completed in about 25 minutes while, under the same conditions, but using a molar ratio of $Ni:Na_2S=20:1$ the reduction requires 1 hour.

The aqueous suspension of finely divided reduced nickel obtained in this manner, can be directly used for the preparation of nickel carbonyl. As an alternative the suspension can be first filtered. The finely divided nickel obtained in this manner is particularly active and reacts already at room temperature with carbon monoxide under a pressure of 10 atm. The carbonylation rate increases quickly at higher carbon monoxide pressure. For example, if a suspension of nickel hydroxide reduced in the presence of sodium sulfide at a molar ratio of $Ni:Na_2S=10:1$ is treated with carbon monoxide at 55° C. at 25 atm. the reaction is completed in 4 hours, at 45 atm. in 50 minutes, at 70 atm. in 35 minutes and at 140 atm. in 17 min. At low carbon monoxide pressures, the influence of temperature on the carbonylation is negative, that is the reaction rate decreases by increasing the temperature. The $Ni:Na_2S$ ratio also influences the carbonylation rate, especially when low partial pressures of carbon monoxide are used.

The reactions involved in this process (assuming that the starting $Ni(OH)_2$ is prepared from $NiCl_2$) are as follows:

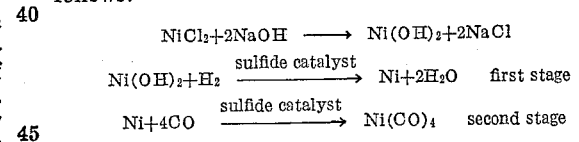

or:

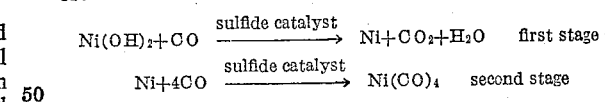

Instead of the chloride, any organic or inorganic nickel salt can be used, provided that it is not the salt of a strongly oxidizing acid. Instead of sodium hydroxide, any other alkali or earth alkali base can be used while, in lieu of hydrogen and carbon monoxide, mixtures of both gases or gases containing them can be used.

Both reduction and carbonylation reactions can be carried out in one or in two different reactors. The latter is preferable because the two phases have different optimum conditions.

As previously mentioned, contrary to the prior processes for preparing nickelcarbonyl from a nickel hydroxide suspension, in the herein claimed carbonylation reaction the carbon dioxide formation is limited only to traces. This simplifies substantially the recovery of nickelcarbonyl, because at room temperature and ordinary pressure, one liter $CO_2$ entrains one liter of nickel carbonyl vapors. The reaction rate is not influenced by the concentration of the nickel suspension and, therefore, diluted or concentrated suspensions can be employed; for example, operations with suspensions containing 15% nickel can be performed without any inconvenience.

The process can be carried out either as batch or continuous process.

The following examples are presented to illustrate but in no way to limit the present invention:

*Example 1*

125 parts $NiCl_2$, 275 parts water, 155 parts of a 30% NaOH solution and 5 parts $Na_2S$ are charged into a reactor provided with a blade stirrer and electrically heated from outside. After carefully displacing the air in the reactor with hydrogen, the mixture is heated to 135–140° C. and hydrogen gas of 70 atm. is introduced. A quick decrease of pressure is almost immediately noted which shows the commencement of $Ni(OH)_2$ reduction to metal nickel. The reduction is completed after 17 minutes. After cooling, unreacted hydrogen is discharged, the temperature is brought to 100° C. and carbon monoxide of 140 atm. is introduced. The carbonylation reaction starts immediately and is completed after 17 minutes.

The conversion of nickel hydroxide to nickelcarbonyl is 88.4% while the yield, based on the converted product, is almost quantitative. In the exhaust gases the presence of carbon dioxide is not noted.

*Example 2*

125 parts $NiCl_2$, 275 parts water, 185 parts 30% NaOH solution and 1.2 parts $Na_2S$ are charged into the apparatus described in Example 1. The temperature is raised to 150° C. and a gas mixture consisting of carbon monoxide and hydrogen at a ratio of 1:1 is introduced under a pressure of 150 atm. The reduction to nickel starts quickly and is completed after 30 minutes. Only small proportions of carbon dioxide are present in the unreacted gas, essentially consisting of hydrogen and carbon monoxide. This fact shows that the reaction equilibrium in the first stage of our process is in favor of the reduction of nickel hydroxide to metal nickel by means of hydrogen, and that thereafter the conversion of metal nickel to nickelcarbonyl occurs in a second stage, as described in Example 1.

The nickel constituent of nickelcarbonyl obtained represents 95% of the nickel introduced.

*Example 3*

125 parts $NiCl_2$, 255 parts water, 150 parts 30% NaOH solution and 5 parts $Na_2S$ are charged into the apparatus described in Example 1. The reduction with hydrogen of 75 atm. and at a temperature of 135–140° C. is completed after 45 minutes. After cooling, hydrogen is discharged and the carbonylation reaction is carried out at 55° C. at a carbon monoxide pressure of 25 atm. The carbonylation is completed after three hours and forty minutes. Only traces of carbon dioxide are present in the discharged gas. The nickel conversion to nickelcarbonyl is 89.1%.

*Example 4*

Example 3 is repeated, but at a hydrogen pressure of 25 atm. and a temperature of 160° C. The reduction is completed within forty minutes. After cooling and discharging gaseous products, carbonylation is carried out at 45–50° C. under 45 atm. of carbon monoxide. The reaction is completed after one hour.

Nickel converted into nickelcarbonyl represents 89% of the nickel charged in form of the salt.

*Example 5*

Example 3 is repeated. The carbonylation reaction is completed after one hour at 25° C. operating at a pressure of 45 atm.

82% of the nickel is converted to nickelcarbonyl.

*Example 6*

The reaction is carried out as in Example 1, but using 125 parts nickel chloride, 275 parts water, 150 parts NaOH and employing barium monosulfide (7 parts BaS), as catalyst. The reduction is carried out at 200° C. for fifteen minutes under a hydrogen partial pressure of 30 atm. and the carbonylation at 55° C. for forty-five minutes under a CO partial pressure of 45 atm. Conversion is 90.1%.

*Example 7*

The process is carried out as in Example 1 but starting with 125 parts nickel chloride, 275 parts water, 150 parts NaOH and using 2 parts carbon disulfide as a catalyst. The mixture is reduced with hydrogen at 160° C. under a hydrogen partial pressure of 40 atm.; reduction time twelve minutes. The carbonylation is carried out as 55° C. under a CO pressure of 45 atm.; carbonylation time 47 minutes. Conversion 92.8%.

*Example 8*

The process is carried out in the apparatus of Example 1. 125 parts nickel chloride, 275 parts water, 145 parts NaOH and, as a catalyst, 2.5 parts sodium sulfide are employed. The reduction is carried out with CO at 200° C. in two stages in order to remove $CO_2$ from the autoclave. During the reduction the CO partial pressure is 30 atm. The carbonylation is carried out at 52° C. under a CO pressure of 45 atm. The conversion yield is 72.4%.

*Example 9*

The process is carried out in the apparatus of Example 1. 125 parts nickel chloride, 145 parts NaOH, 275 parts water and, as a catalyst, 2.5 parts $Na_2S$ are used. The reduction is carried out with a mixture of $H_2$ and CO at a ratio of 70:30, at 200° C.; total pressure is 60 atm., reduction time twenty minutes. The gas discharged after the reduction step contains 4.6 parts $CO_2$. Carbonylation is carried out at 50° C. with CO of 45 atm. The conversion yield is 91.3%.

In the examples, the parts indicated are by weight. The catalyst is used in the proportion of from 1 mol to 14 mols per 100 mols nickel hydroxide. Carbon disulfide, barium sulfide or sodium sulfide are used as catalysts. Carbon disulfide is efficient in less amounts, giving higher conversions than other sulfides. With barium sulfide the reaction is completed in less time than with sodium sulfide.

Broadly, the operations of the present invention consist in reducing a suspension of nickel hydroxide to finely divided metallic nickel in the presence of an organic or inorganic sulfide by heating the suspension in an enclosed vessel to 120–220° C., preferably to 150–180° C., while stirring, introducing reducing gas ($H_2$ and/or CO) to put the enclosed vessel under a pressure of 5–200 atm., more precisely under 15–30 atm. partial pressure of the reducing gas, continuing stirring and heating until the reduction is completed, cooling, discharging reduction gas which, if CO has been used, may comprise a small amount of $CO_2$, adjusting to a temperature ranging from room temperature to 160° C., preferably between 20–70° C., stirring, introducing carbon monoxide to put the enclosed vessel under a total pressure of 10–200 atm., preferably of 30–60 atm., and continuing the reaction until the desired amount of nickel carbonyl has formed. As may be seen from the foregoing, even if carbon monoxide alone or in admixture with hydrogen is used as the reducing agent, at the relatively higher temperatures and low CO partial pressures preferably used in connection with the first step, only a reduction of the nickel hydroxide to metallic nickel takes place, while the reduced nickel is then readily carbonylated at the preferred lower temperatures of the second step.

We claim:

1. The method of preparing nickel carbonyl which comprises as a first step reducing in a reaction vessel an aqueous suspension of nickel hydroxide, in the presence of, per each mol of nickel from 1/20 to 1/10 mol of a sulfide taken from the group consisting of carbon disulfide, barium sulfide and sodium sulfide, heating to a temperature of 150 to 180° C. while stirring, introducing a reducing gas taken from the group consisting of carbon monoxide, hydrogen and mixtures thereof until a partial reduction gas pressure of 15 to 30 atm. is attained, continuing stirring and heating until the reduction to finely divided metallic nickel is completed, cooling, discharging the gaseous content of the reaction vessel; and, as a second step, adjusting to a temperature of 20 to 70° C., stirring, introducing carbon monoxide into the aqueous mixture of sulfide containing metallic nickel to put the enclosed vessel under a total pressure of 30 to 70 atm. and continuing stirring and heating until the desired amount of nickel carbonyl has formed.

2. The method of preparing nickel carbonyl according to claim 1, wherein nickel hydroxide suspended in a saline solution is introduced into said reaction vessel.

3. The method of preparing nickel carbonyl according to claim 1, wherein said sulfide is sodium sulfide.

4. The method of preparing nickel carbonyl according to claim 1, wherein said sulfide is barium sulfide.

5. The method of preparing nickel carbonyl according to claim 1, wherein said sulfide is carbon disulfide.

6. The method of preparing nickel carbonyl comprising, as a first step, reducing nickel hydroxide in aqueous suspension in the presence of a catalyst comprising at least 1/20 mol of a sulfide per each mol of nickel, the catalyst being taken from the group consisting of carbon disulfide, alkali sulfides, and alkaline earth sulfides, the mols sulfide being present in an amount less than the mols nickel, the reducing being with a reducing gas taken from the group consisting of carbon monoxide, hydrogen and mixtures thereof, at 120 to 220° C. and at a pressure of 5 to 200 atm., the partial pressure of the carbon monoxide, when employed, being not greater than about 30 atmospheres, continuing the reduction until reduction to finely divided metallic nickel is accomplished, discharging any $CO_2$ formed in the reduction, and, as a second step, adjusting to a temperature ranging from about room temperature to 160° C., stirring, introducing carbon monoxide gas into the sulfide containing suspension of nickel until a pressure of 30 to 60 atm. has been attained and continuing stirring and heating until the desired amount of nickel carbonyl has formed.

7. The process of claim 6, the nickel hydroxide-catalyst suspension being prepared by treating nickel chloride with a base taken from the group consisting of alkali and alkaline earth bases.

8. The process of claim 1, the nickel hydroxide-catalyst suspension being prepared by treating nickel chloride with a base taken from the group consisting of alkali and alkaline earth bases.

9. The method of preparing nickel carbonyl which comprises as a first step heating together, in liquid water, nickel hydroxide, a catalyst sulfide taken from the group consisting of carbon disulfide, alkali sulfides and alkaline earth sulfides, and a reducing gas taken from the group consisting of carbon monoxide, hydrogen and mixtures thereof, at 120° to 220° C. and a reducing gas pressure of at least five atmospheres, until reduction to finely divided metallic nickel is accomplished, the partial pressure of the carbon monoxide, when employed, being not greater than 30 atmospheres, discharging any $CO_2$ formed in the reduction, and, as a second step, adjusting to a temperature ranging from about room temperature to 160° C., and introducing carbon monoxide gas into the sulfide containing suspension of metallic nickel to reduce the metallic nickel to nickel carbonyl, the reduction being at 30 to 60 atmospheres.

10. The method of preparing nickel carbonyl which comprises as a first step heating together, in liquid water, nickel hydroxide, a catalyst sulfide taken from the group consisting of carbon disulfide, alkali sulfides and alkaline earth sulfides, and a reducing gas taken from the group consisting of carbon monoxide, hydrogen and mixtures thereof, at a temperature of at least about 120° C. and at superatmospheric pressure of at least five atmospheres, until reduction to finely divided metallic nickel is accomplished, the partial pressure of the carbon monoxide, when employed, being not greater than 30 atmospheres, discharging any $CO_2$ formed in the reduction, and, as a second step, adjusting to a temperature ranging from about room temperature to 160° C., and introducing carbon monoxide gas into the sulfide containing suspension of metallic nickel to reduce the metallic nickel to nickel carbonyl, the latter reduction being at 30 to 60 atmospheres.

11. The method of preparing reactive metallic nickel which comprises heating an aqueous suspension of nickel hydroxide, in the presence of a catalyst comprising a sulfide taken from the group consisting of carbon disulfide, alkali sulfides and alkaline earth sulfides, with a reducing gas taken from the group consisting of carbon monoxide, hydrogen and mixtures thereof, at superatmospheric pressure of at least five atmospheres until reduction to finely divided metallic nickel is accomplished, the partial pressure of the carbon monoxide, when employed, being not greater than about 30 atmospheres.

12. The method of preparing reactive metallic nickel which comprises heating an aqueous suspension of nickel hydroxide, in the presence of a catalyst comprising a sulfide taken from the group consisting of carbon disulfide, alkali sulfide and alkaline earth sulfides, with a reducing gas taken from the group consisting of carbon monoxide, hydrogen and mixtures thereof, at superatmospheric pressure until reduction to finely divided metallic nickel is accomplished, the said heating being at a temperature above about 120° C., the pressure being from about 5 to 200 atmospheres, the partial pressure of the carbon monoxide, when employed, being not greater than about 30 atmospheres.

13. A method of preparing reactive metallic nickel, comprising treating nickel chloride ($CiCl_2$) in water with sodium hydroxide, and reducing the aqueous nickel hydroxide suspension so produced by introducing a reducing gas, the reduction being in the presence of a minor amount by weight of a sulfide taken from the group consisting of alkali sulfides, alkaline earth sulfides, and carbon disulfide, at a temperature of 120 to 220° C. and at 5 to 200 atmospheres pressure, the reducing gas comprising a member of the group consisting of hydrogen, carbon monoxide, and mixtures thereof, the partial pressure of the carbon monoxide, when employed, being not greater than about 30 atmospheres.

14. The process of claim 6, the reducing gas consisting essentially of hydrogen.

15. The process of claim 9, the reducing gas consisting essentially of hydrogen.

16. The process of claim 13, the reducing gas being at least mainly hydrogen.

References Cited in the file of this patent

UNITED STATES PATENTS

| | | |
|---|---|---|
| 455,229 | Mond | June 30, 1891 |
| 1,103,747 | Fierz | July 14, 1914 |
| 2,548,727 | Kincaid et al. | Apr. 10, 1951 |
| 2,590,078 | Maeder | Mar. 25, 1952 |
| 2,615,831 | Bishop et al. | Oct. 28, 1952 |